(No Model.)
C. MILLER.
POOL RACK.
No. 311,843. Patented Feb. 3, 1885.
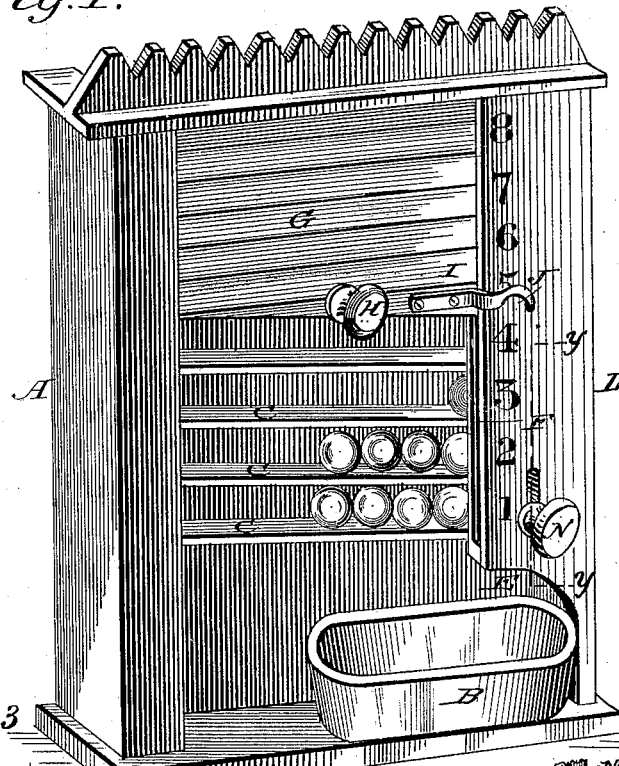
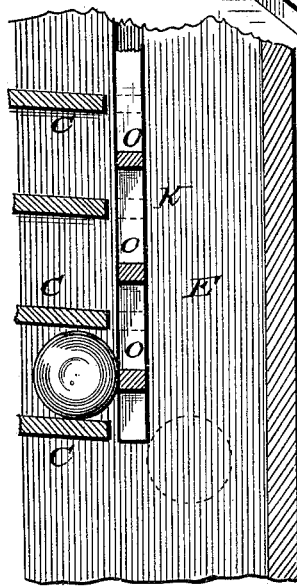
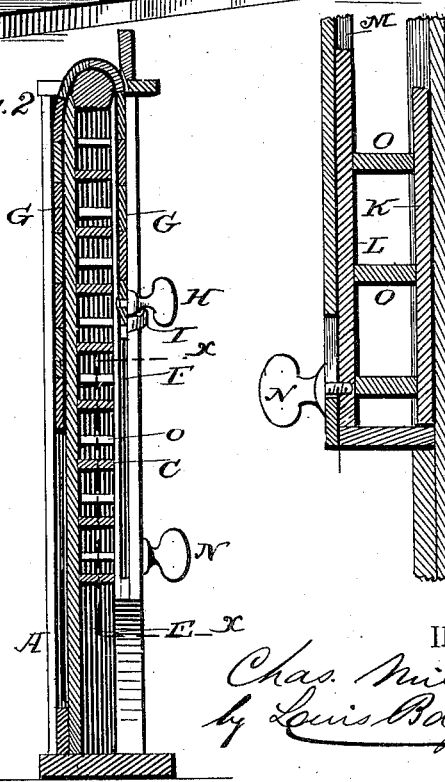
WITNESSES:
Fred. L. Dieterich
Wm. N. Benton
INVENTOR.
Chas. Miller
by Louis Bagger & Co.
ATTORNEYS.

UNITED STATES PATENT OFFICE.

CHARLES MILLER, OF AUBURN, NEW YORK.

POOL-RACK.

SPECIFICATION forming part of Letters Patent No. 311,843, dated February 3, 1885.

Application filed June 23, 1884. (No model.)

*To all whom it may concern:*

Be it known that I, CHARLES MILLER, a citizen of the United States, and a resident of Auburn, in the county of Cayuga and State of New York, have invented certain new and useful Improvements in Pool-Racks; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved pool-rack. Fig. 2 is a vertical sectional view of the same. Fig. 3 is a transverse sectional view on the line $x\ x$ in Fig. 2, and Fig. 4 is a sectional view on the line $y\ y$ in Fig. 1.

The same letters refer to the same parts in all the figures.

This invention relates to that class of devices which are used for retaining pool or billiard balls in position when not in use, or when placed in such rack by the players; and it has for its object to so construct a device of the said class that the entire number of balls may, at the conclusion of the game, be automatically gathered in a basket or receptacle at the bottom of the rack.

The invention further consists in the improved construction and arrangement of parts, which will be hereinafter fully described, and particularly pointed out in the claim.

In the drawings, A designates the body of my improved pool-rack, which is provided at its lower end with a basket or receptacle, B, of sufficient size to accommodate the entire number of balls. Above the said basket the body of the rack is provided with a series of shelves, C C, which are inclined toward one side of the said rack, so that the balls, when placed upon the said shelves, shall have a tendency to roll toward the side which is designated by letter D. The latter side is provided with a vertical chute or passage, E, connecting the said shelves with the basket or receptacle at the bottom of the rack. The front side of the rack is provided with suitable grooves, F F, adapted to accommodate a folding cover, G, the lower end of which is provided with a suitable handle, H, by means of which it may be conveniently manipulated. The lowermost slat of the said cover is provided with a laterally-extending arm, I, having a notch, J, the purpose of which will be hereinafter stated.

K is a rod or bar, arranged to slide vertically in the side of the rack or frame, which is designated by letter D. The said bar is provided with a forwardly-extending arm, L, sliding vertically in a slot, M, in the front side of the frame, and provided with a knob or handle, N, by means of which it may be operated. The said bar is provided with a series of fingers, O O, arranged to register with the several shelves of my improved rack; and it will be seen that by sliding or moving the said bar in either an upward or downward direction the said fingers may be caused to register exactly with the shelves, or arranged intermediately between the latter. When the latter is the case, it will be clearly seen that such balls as may be placed upon the shelves are retained in position, while, when the bar is lowered, so as to cause the fingers to register with the shelves, the balls will roll off the latter and pass through the chute E to the basket or receptacle at the bottom of the rack.

The operation and advantages of this invention are so obvious as to require no extended explanation. When the balls are placed in the rack, they will be retained by means of the fingers upon the bar at the lower end of the shelves. When the game has been concluded, and it is desired to gather the balls, it is only necessary to lower the sliding bar by means of the handle attached thereto, when the entire number of balls will automatically drop into the basket or receptacle. When the game has been concluded, or when the players do not desire to proceed with another game, the folding cover of the rack is drawn down, and the arm projecting from the lowermost slat of said cover will then strike the handle projecting from the vertically-sliding rod, thus lowering the latter and causing the balls to pass from the several shelves of the rack to the basket or receptacle.

It is obvious that this device may be provided with any desired number of shelves to accommodate any desired number of players. I would also have it understood that modifications in the construction of the folding cover and other detailed portions of the device may be resorted to without departing from the spirit of my invention.

Having thus described my invention, I claim and desire to secure by Letters Patent of the United States—

As an improvement in pool-racks, the combination with a frame having a series of inclined shelves, and a chute or passage connecting the said shelves with a basket or receptacle at the bottom of the frame, of a vertically-sliding bar having fingers arranged to register with the lower ends of the said shelves or the intermediate spaces, and having a handle extending forwardly through a slot in the front part of the frame, and a vertically-sliding flexible cover having a laterally-extending arm adapted to engage the handle of the vertically-sliding retaining-bar, substantially as and for the purpose set forth.

In testimony that I claim the foregoing as my own I have hereunto affixed my signature in presence of two witnesses.

CHARLES MILLER.

Witnesses:
J. LEE BUNDY,
HORACE T. COOK.